(12) United States Patent
Nayak et al.

(10) Patent No.: US 7,247,960 B2
(45) Date of Patent: *Jul. 24, 2007

(54) MOTOR/ENCODER ASSEMBLY FOR TAPE DRIVES

(75) Inventors: Ashok B. Nayak, Glendora, CA (US); Robert R. Heinze, San Clemente, CA (US)

(73) Assignee: Quantum Corporation, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/433,665

(22) Filed: May 11, 2006

(65) Prior Publication Data

US 2006/0202574 A1   Sep. 14, 2006

Related U.S. Application Data

(60) Continuation of application No. 11/243,938, filed on Oct. 4, 2005, now Pat. No. 7,145,272, which is a division of application No. 10/259,738, filed on Sep. 30, 2002, now Pat. No. 7,126,786.

(60) Provisional application No. 60/326,610, filed on Oct. 1, 2001.

(51) Int. Cl.
*H02K 7/00* (2006.01)
*H02K 11/00* (2006.01)

(52) U.S. Cl. .................................. 310/68 B; 310/67 R

(58) Field of Classification Search ............. 310/67 R, 310/68 B, 68 R, 156.05–156.08, 261; 360/98.07, 360/99.01, 99.09, 99.12; 324/207.25, 207.05, 324/173–174
See application file for complete search history.

(56) References Cited

U.S. PATENT DOCUMENTS

| | | | | |
|---|---|---|---|---|
| 3,780,965 A | * | 12/1973 | Williams et al. | 242/355.2 |
| 4,795,925 A | * | 1/1989 | Mihara et al. | 310/68 B |
| 4,988,905 A | * | 1/1991 | Tolmie, Jr. | 310/68 B |
| 5,811,904 A | * | 9/1998 | Tajima et al. | 310/156.45 |
| 6,584,056 B1 | * | 6/2003 | Kusaki et al. | 720/606 |
| 6,891,695 B1 | * | 5/2005 | Falace et al. | 360/85 |

FOREIGN PATENT DOCUMENTS

| JP | 1308153 | * | 12/1989 | 310/68 B |
|---|---|---|---|---|
| JP | 5292729 | * | 5/1993 | 310/156.05 |

* cited by examiner

*Primary Examiner*—Tran Nguyen
(74) *Attorney, Agent, or Firm*—Mark J. Spolyar

(57) ABSTRACT

A magnetic/encoder assembly has a compact design and combines the features of motor, encoder and chuck locating feature within a single motor housing. The motor/encoder includes a DC brushless motor with an inner magnetic rotor. The motor windings and the commutation electronics are mounted towards the bottom side of a printed circuit board. The rotor of the motor is extended above the surface of the printed circuit board. The extended rotor provides a precision seat for the magnetic wheel with multiple poles. The top surface of the printed circuit board mounts the sensor for the encoder. The extension of the rotor provides the precision mounting surface of the cartridge driving chuck.

12 Claims, 5 Drawing Sheets

MOTOR/ENCODER ASSEMBLY FOR TAPE DRIVES

CROSS-REFERENCE TO RELATED APPLICATIONS

This application is a continuation of U.S. patent application Ser. No. 11/243,938, filed Oct. 4, 2005, now U.S. Pat. No. 7,145,272, which is a divisional of U.S. application Ser. No. 10/259,738, filed Sep. 30, 2002, now U.S. Pat. No. 7,126,786 which claims the benefit of U.S. Provisional Patent Application No. 60/326,610 filed on Oct. 1, 2001, all of which are incorporated herein by reference.

FIELD OF THE INVENTION

The present invention relates to the field of tape drives, and more particularly, to a motor/encoder system for a magnetic tape drive.

BACKGROUND OF THE INVENTION

In tape drive systems that utilize a single tape cartridge reel, once the cartridge is loaded and is registered at the appropriate datum, the tooth ring coupling of the cartridge reel becomes engaged with the motor system of the tape drive. The lead end of the tape, which is called the leader block or leader pin, is then transferred from the cartridge reel to the take up reel located inside the tape drive. This take up reel is also attached to a motor system. Once a leader pin has been successfully moved to the take up reel, the tape is located against the magnetic head of the tape drive and both of the reels of the tape drive are ready to be rotated by the motor/encoder, to start the read/write process.

The motor/encoder system of a tape drive may have a number of functions, depending on the design of the tape drive. For example, the motor/encoder system can control the tape speed, regulate tape tension and align the take-up reel at a precise location to properly receive the leader pin.

As the form-factor requirement of single reel cartridge tape drives decreases, the size of the components used to create the tape drive also diminish. Recent tape drives the use LTO cartridges have a form factor requirement of 5¼ inch. One of the requirements of this form factor is that the entire tape drive must fit into a height of 3¼ inch. Therefore, the motor/encoder system must also be designed to fit and properly function in a very limited space.

Motor/encoder systems for precisely controlling the motor speed are known. In many such systems, the motor and the encoder are separate, individual components. The problem with this type of design is the space required to accommodate two separate parts; the motor and the encoder. In a tape drive system with a form-factor requirement, there is no space available for two separate motor and encoder components. Furthermore, providing two separate components normally have a higher cost in comparison to provision of a single component having dual functionality. It also adds assembly time and added cost of inventory.

Another concern of certain encoding arrangements arises because of the use of a magnetic shaft encoder that employs a gear or a toothed wheel for inducing periodic electrical pulses in an inductive pick-up. The teeth of the wheel are evenly spaced and every tooth generates a signal as it passes the pick-up. One problem with such an encoder is its relatively limited resolution. This is because the size of the tooth is limited in how small the tooth can be made. In other arrangements, a magnetic code wheel is employed. Such arrangements use an inductive coil concept or a moving coil, movable together with a rotor, that interacts with the magnetic code wheel. A major concern with such an application is routing of the wire from the movable coil mounted at the center of the rotor. It requires a rotary shaft having a through hole formed along the axis of rotation of the motor's shaft to route the coil lead wires.

There is a need for an arrangement in which the motor/encoder system is packaged in the smallest practical volume, yet provide the functions of housing a DC brushless motor with its driver circuitry, a magnetic encoder with necessary sensors and provide precision mounting and locating features for a cartridge driver component.

SUMMARY OF THE INVENTION

These and other needs are met by embodiments of the present invention which provide a tape drive comprising a rotor compartment, and means housed within the rotor compartment for coupling a rotor to a tape cartridge, rotating a tape cartridge reel, and encoding a position of the rotor. In certain embodiments of the invention, a magnetic code wheel is attached to the rotor that is rotatably mounted within the motor compartment. A magnetic code wheel sensor is stationarily positioned within the rotor compartment, which senses rotation of the magnetic code wheel. The invention thus improves upon the current limited resolution offered by devices which employ a toothed ring gear and inductive pick-up. Since all three functions are housed within a single rotor (or motor) compartment, a compact design can be provided.

The earlier stated needs are also met by other embodiments of the present invention which provide a motor/encoder assembly for a tape drive, comprising a motor housing and a DC motor mounted in the housing. The DC motor has a rotor, a field magnet attached to the motor, motor laminations and windings. A code wheel is mounted on the rotor within the motor housing. A code wheel sensor is fixedly mounted within the motor housing. A chuck mounting element is provided on the rotor.

The earlier stated needs are also met by another aspect of the present invention which provides a tape drive with a motor/encoder assembly comprising a motor housing, a DC brushless motor with driver circuits located entirely within the housing, and an encoder with encoder sensors located entirely within the motor housing. The tape cartridge driver is mounted on the DC brushless motor.

The foregoing and other features, aspects and advantages of the present invention will become more apparent from the following detailed description of the present invention when taken conjunction with the accompanying drawings.

DETAILED DESCRIPTION OF THE INVENTION

The present invention addresses and solves problems related to providing motor, encoding and cartridge locating features within a tape drive in a particularly compact manner. These and other problems are solved, in part, by the present invention which provides a DC brushless motor with an inner magnetic rotor. The motor windings and the necessary computation electronics are mounted toward the bottom side of a printed circuit board. The rotor of the motor is extended above the surface of the printed circuit board. The extended rotor provides a precision seat for a magnetic code wheel with multiple poles. The top surface of the printed circuit board provides a mounting surface for the necessary sensors for the encoder. The extension of the rotor provides a precision mounting surface for a cartridge driving chuck. The present invention thus provides a motor, encoder and cartridge coupling device all to be housed in a single rotor (motor) compartment.

Figure 1:
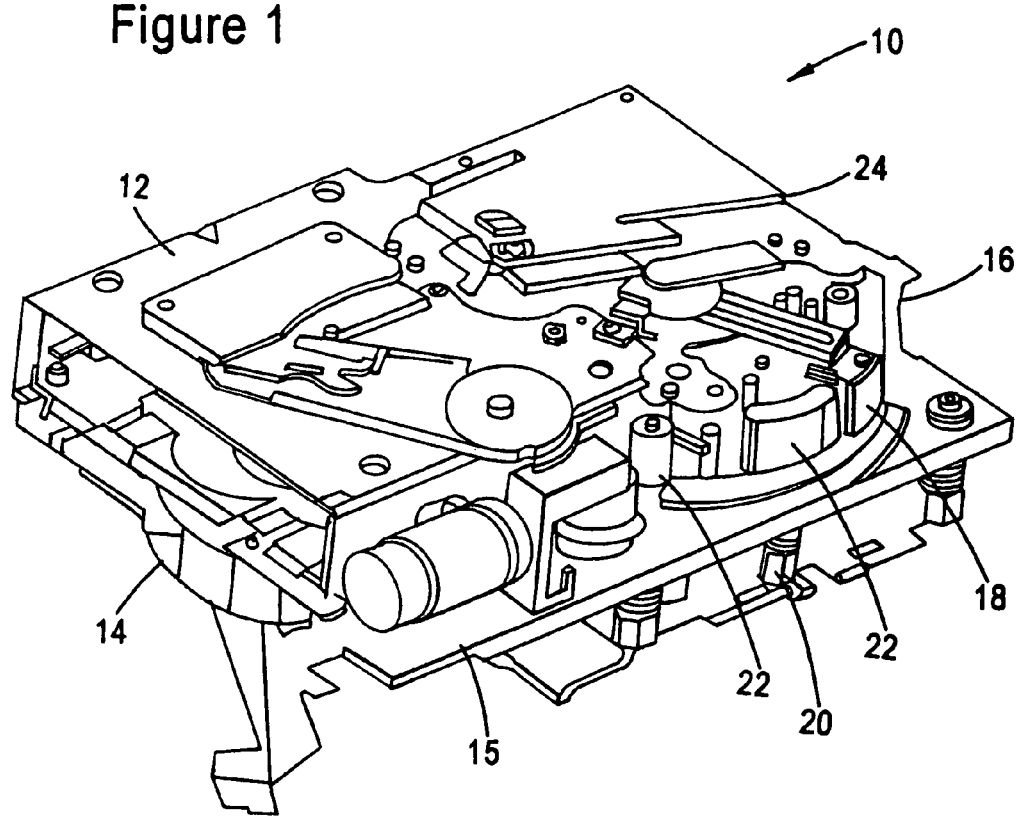
FIG. 1 is a perspective view of a tape transport mechanism constructed in accordance with embodiments of the present invention.

FIG. 1 is a perspective view of the tape transport of a tape drive 10. The housing for the tape drive 10 is not shown to allow depiction of the internal components of the tape drive 10. A cartridge loader 12 for loading LTO tape cartridges (not shown) is provided on a base plate 15. Underneath the base plate 15 are motor/encoders. A portion of the cartridge reel motor/encoder 14 is depicted in FIG. 1.

The function of the cartridge loader 12 is to load and register the tape cartridge (not shown) on the main datum, which is the surface where the cartridge is placed. The main datum is located on the base plate 15.

Figure 2:
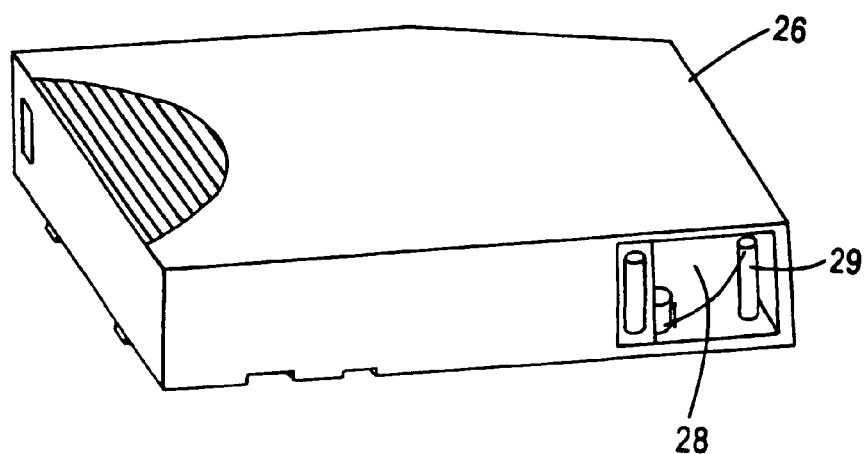
FIG. 2 depicts a perspective view of a LTO single reel cartridge usable with the tape drive of the present invention.

The function of the tape-loading mechanics of the tape transport is to transfer the front end of the tape, termed the leader pin, to the hub of the take-up reel 24. The magnetic head 18, positioned by a head positioner system 20, performs the function of writing and reproducing data on the magnetic recording tape. The tape path system includes a number of tape guides (generally indicated by reference numeral 22), that are utilized to guide and control the tape motion. FIG. 2 depicts an exemplary embodiment of a LTO, single reel cartridge 26. A portion of the cartridge reel 28 is shown. The leader pin 29 is provided at one end of the tape of the single reel cartridge 26.

Figure 3:
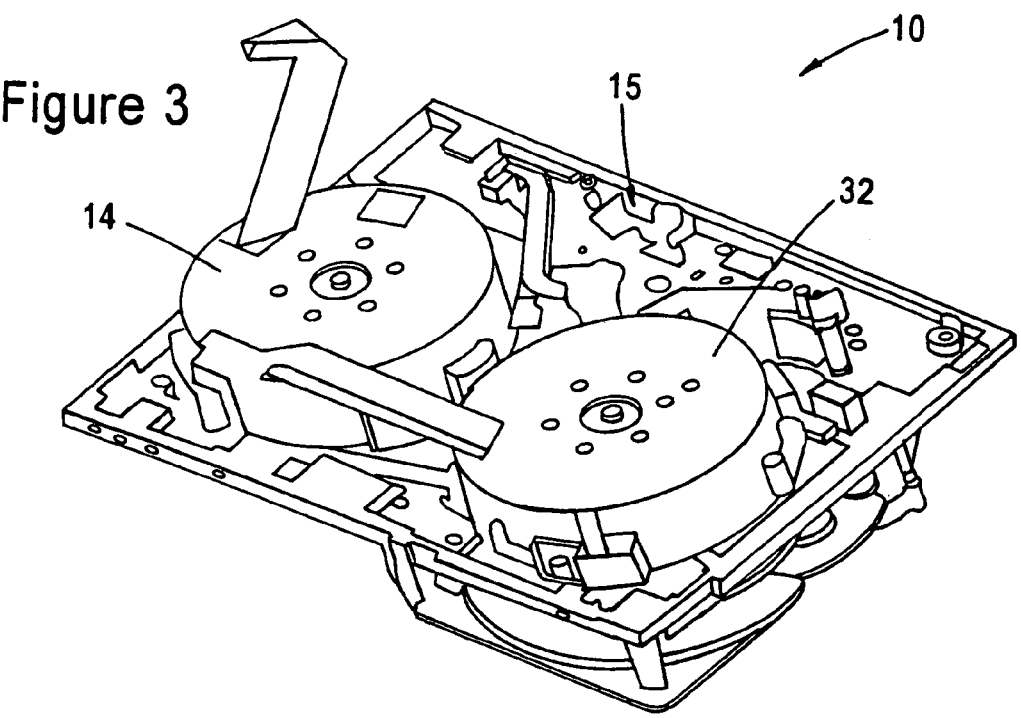
FIG. 3 depicts a bottom view of the tape transport in accordance with embodiments of the present invention.

In FIG. 3, a bottom view of the device 10 of FIG. 1 is depicted. There are two motor/encoder assemblies 14, 32 coupled to the base plate 15. The motor/encoder assembly 14 is provided for the cartridge reel 28, while the motor/encoder assembly 32 is for the take-up reel 24. The cartridge reel motor/encoder assembly 14 engages to the cartridge reel 28 when the cartridge 26 is registered in the tape drive 10. The take-up reel 24 is mounted during assembly onto the take-up reel motor/encoder assembly 32. The same motor/encoder assembly configuration may used for both of the motor/encoder assemblies 14, 32, in certain embodiments of the invention.

Figure 4:
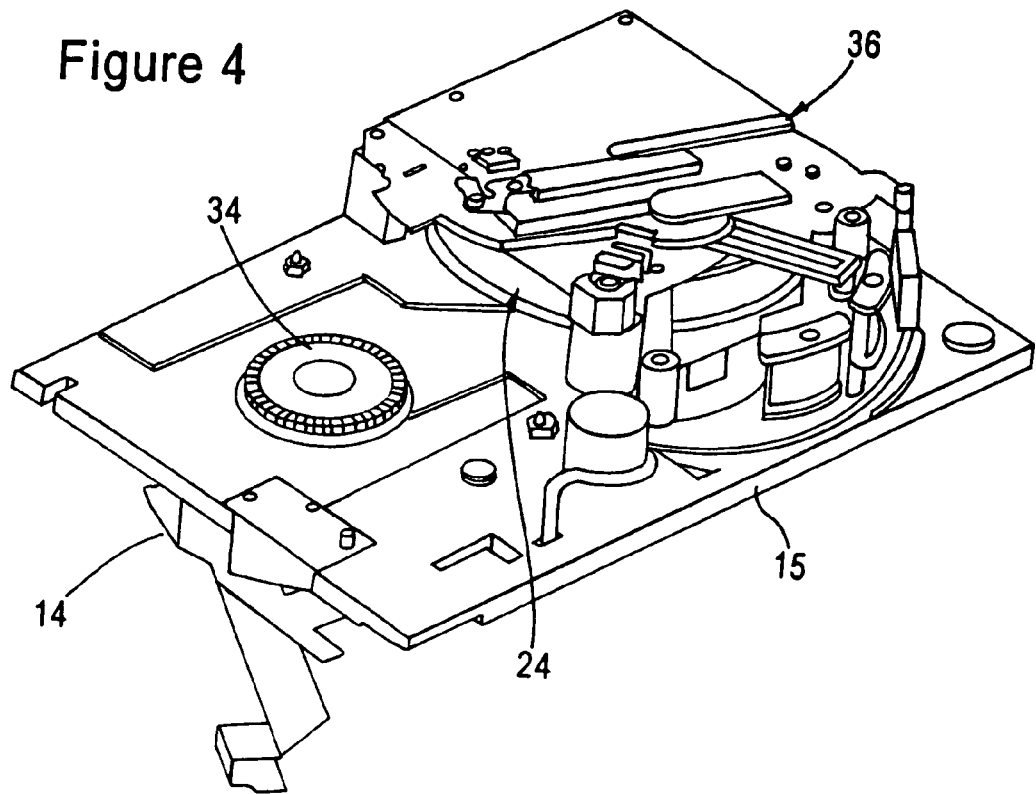
FIG. 4 shows the tape transport of FIG. 1, but with the cartridge loader removed for illustrative purposes.

In FIG. 4, a top view of the tape drive is provided, but the cartridge loader 16 has been removed from this view in order to better illustrate some features of the present invention. A chuck 34 that drives the cartridge reel 28 is provided above the base plate 15. The chuck is precisely positioned and mounted on the cartridge reel motor/encoder 14. Specifically, the chuck 34 is mounted on the extension of a rotor of the motor/encoder 14. The arrangement 36 for receiving the leader pin 29 at the take-up reel 24 is also shown in FIG. 4.

Figure 5:
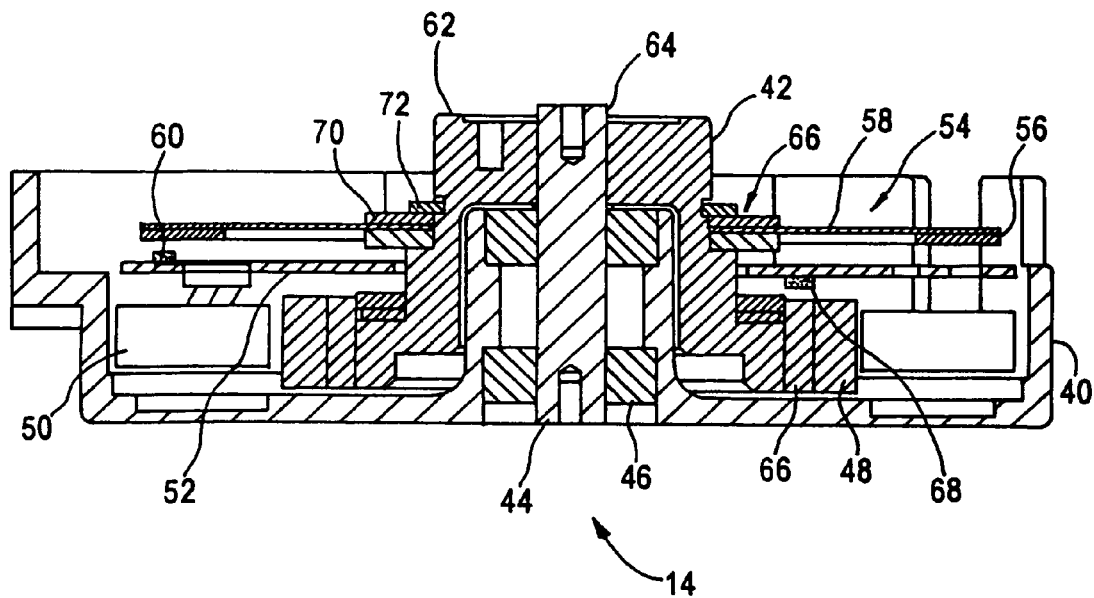
FIG. 5 shows a schematic depiction of a cross-section of the motor/encoder system using a magnetic encoder, constructed in accordance with embodiments of the present invention.
Figure 6:
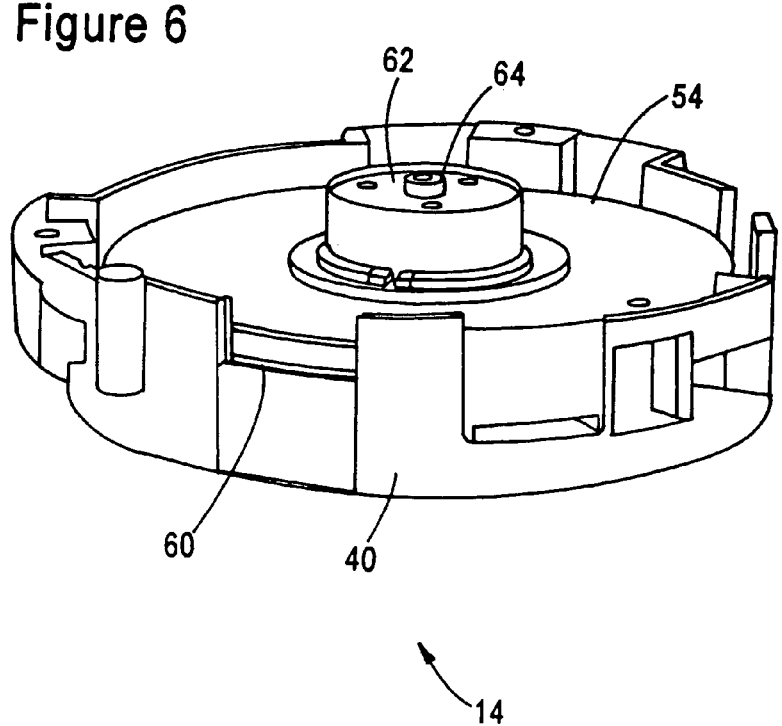
FIG. 6 shows an assembled motor/encoder system constructed in accordance with embodiments of the present invention.
Figure 7:
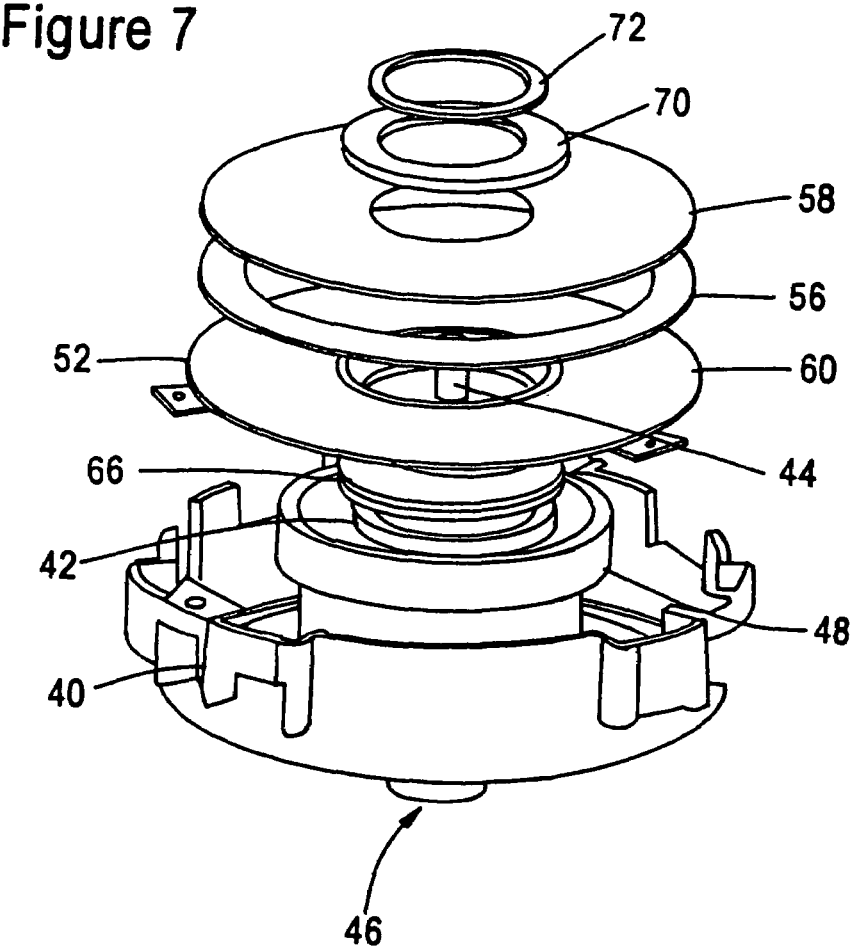
FIG. 7 shows the motor/encoder system of FIG. 6 in an exploded view.

FIGS. 5, 6 and 7 depict a motor/encoder assembly in accordance with embodiments of the present invention. For ease of description purposes, the motor/encoder assembly will be referred to as reference numeral 14, although it should be clear that the same embodiment of a motor/encoder assembly may be employed for the motor/encoder assembly 32.

The motor/encoder assembly of FIGS. 5-7 has a magnetic encoder arrangement. FIGS. 5 and 6 show the assembly in an assembled state, while FIG. 7 is an exploded view of the motor/encoder assembly 14. The motor/encoder assembly 14 includes a housing 40 that houses a rotor 42 mounted on a shaft 44. The rotor 42 and shaft 44 are mounted on ball bearings 46, so the shaft 44 is a rotary shaft.

The motor components include a field magnet 48 attached to the rotor 42. The field magnet 48 interacts with motor laminations and windings 50. A printed circuit board 52 is stationarily positioned within the motor housing 40. The windings 50 are terminated at the bottom surface of the printed circuit board 52. As can be seen, all of the motor components, including the field magnet 48 and the motor laminations and windings 50, are located axially below the printed circuit board 52.

Axially above the circuit is located a magnetic code wheel 54, in the embodiment of FIGS. 5-7. Magnetic code wheel 54 includes an axially magnetized magnet ring 56 held by a magnet-ring holder 58. The magnetic code wheel 54 is held on the rotor 42 by a spacer 70 and a retainer clamp 72. Hence, the magnetic code wheel 54 rotates precisely with the rotation of the rotor 42.

A sensor element 60 is located on the top surface of the printed circuit board 52 and interacts with the magnetic code wheel 54, specifically the axially magnetized magnet ring 56. The sensor 60 may be a linear hall sensor in certain embodiments of the invention, or a magneto-resistive sensor in other embodiments of the invention.

The rotor 42 also has attached to it a commutation magnet 66 that interacts with a commutation sensor 68 located on the bottom surface of the printed circuit board 52. A hall sensor may be employed as the commutation sensor 68.

The rotor 42 extends above the surface of the printed circuit board 52 and the mounting surface for the magnet code wheel 54. The extension of the rotor 42 includes a chuck mounting feature 62 and a chuck locating feature 64. Each of these features provides for precision mounting of the chuck 34 that drives the cartridge reel 28 of the single reel cartridge 26. Alternatively, when the motor/encoder assembly is for the take-up reel 24, the top surface of the rotor 42 serves as the take-up hub-mounting surface. Hence, the same arrangement that provides for the motor and encoding functions, also provides for the chuck location features of the present invention.

Figure 8:
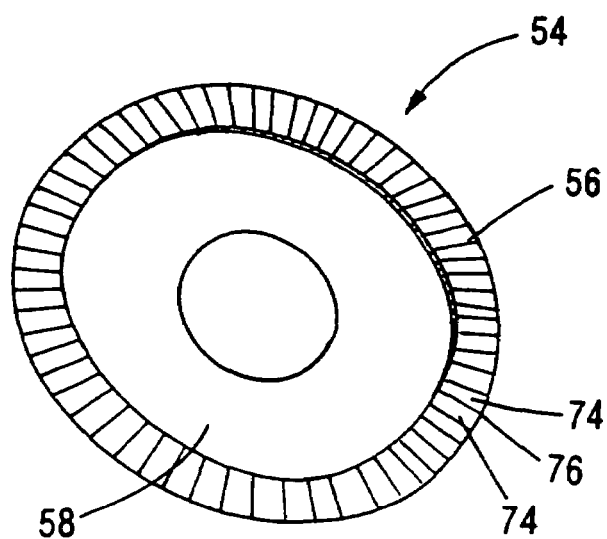
FIG. 8 shows a magnetic code wheel assembly constructed in accordance with an embodiment of the present invention.

As depicted in FIG. 8, the magnetic code wheel 54 includes the axially magnetized magnet ring 56 and a magnet-ring holder 58. In certain preferred embodiments of the invention, the magnet-ring holder 58 is made of steel. The magnet-ring holder 58 provides the return path for the magnet poles.

The magnet poles 74, 76, 74, for example, are alternating north and south poles. When the motor rotates, the interaction of the N-S-N-S . . . poles on the magnet ring 56 with the sensor 60 on top of the printed circuit board 52, as depicted in FIG. 5, provides a sinusoidal waveform output. The sensor 60, which may either be a linear hall sensor or a magneto-resistive sensor as mentioned earlier, provides a signal that is further processed to derive the necessary pulses which are utilized to perform the conventional encoder-assisted functions, such as controlling a tape tension aligning the take-up hub to receive the leader-pin, and so on.

The compact nature of the design in accordance with embodiments of the present invention, as best illustrated in FIGS. 5 and 6, provides advantages in a number of different manners. For example, the relatively shorter span of the shaft 44 that supports the mass of the relevant components, provides an increased structural rigidity of the overall system in comparison to conventional designs that typically employ a longer shaft. Furthermore, another advantage is the enhanced performance of the present invention in comparison to conventional arrangements from the standpoint of environmental conditions. The motor/encoder system uses common components for the motor and for the encoder, such as the housing 40, the printed circuit board 52, the rotor 42 etc. By using common components for the two different systems, the temperature delta between the relevant motor and encoder components will be minimized. This increases the accuracy of the servo control of the motor speed and other functions that are controlled by the encoder components.

The use of a magnetic code wheel arranged as in the present invention improves resolution, as a finely pitched resolution of the magnetic poles may be provided. Also, a magnetic code wheel is advantageous over an optical encoder by eliminating the need to have a dust cover or equivalent item that is normally necessary to prevent contamination in an optical encoder. Also, the use of hall sensors or magneto-resistive sensors reduces costs compared to an inductive pick-up. There is a clear cost advantage over conventional optical encoder systems.

Since all the encoder sensing elements are mounted on the stationary printed circuit board 52, there is no complexity of wire routing from an inductive coil as provided in conventional solutions.

Figure 9:
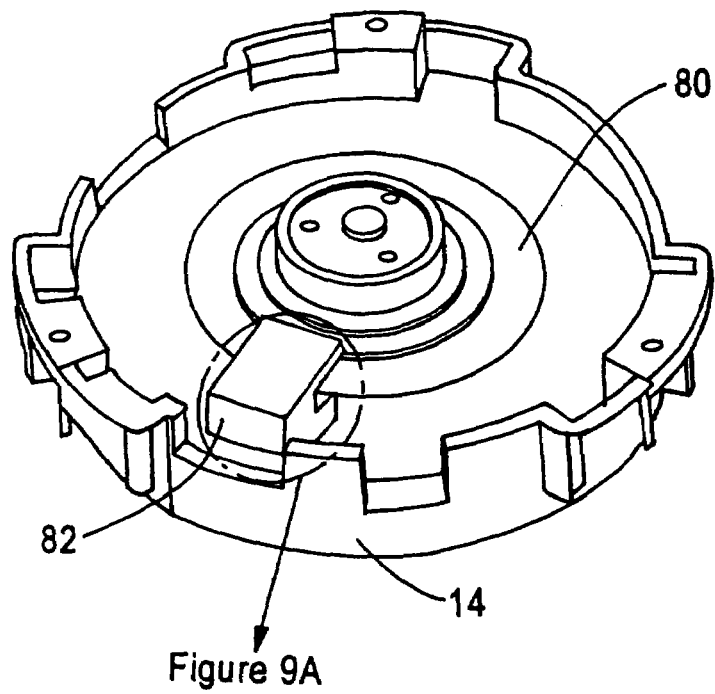
FIG. 9 shows a top perspective view of a motor/encoder assembly constructed in accordance with an embodiment of the present invention in which an optical encoder is employed instead of a magnetic code wheel.
Figure 9A:
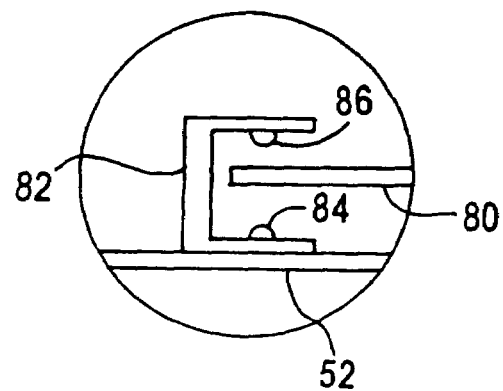

The present invention also can be used with an optical encoder, although a dust cover is normally needed. FIG. 9 shows the system of the present invention with an optical encoder rather than a magnetic code wheel. The optical code wheel 80 has chemically etched features and is attached to the rotor 42 in the same manner as the magnetic code wheel 54 of the embodiment of FIGS. 5-7. The optical code wheel 80 passes through an optical sensor/detector module 82 that is mounted on the printed circuit board 52. The optical sensor/detector module 82 includes a light source 84 that is below the code wheel 80, and a sensor portion 86 that is above the code wheel 80.

The optical encoder of the present invention also provides for a compact arrangement in which the motor, encoding functions and chuck locating functions are provided in a compact package.

Due to the compactness of the present invention, the motor/encoder assembly in accordance with the embodiments of the present invention may be employed in a tape drive that has a 5¼ inch form factor, or that is 3¼ inches high.

Although the present invention has been described and illustrated in detail, it is to be clearly understood that the same is by way of illustration and example only and is not to be taken by was of limitation, the scope of the claims being limited only by the terms of the appended claims.

What is claimed is:

1. A motor/encoder assembly for a tape drive comprising:
   a motor housing;
   a DC motor mounted in the housing, the DC motor having a rotor, a field magnet attached to the rotor, and laminations and windings;
   a code wheel mounted on the rotor within the motor housing;
   a code wheel sensor fixedly mounted within the motor housing;
   a chuck mounting feature on one end of the rotor which extends outside the motor housing; and
   a chuck locating feature on the chuck mounting feature.

2. The assembly of claim 1, further comprising a printed circuit board mounted in the motor housing, the rotor extending axially through the printed circuit board.

3. A tape drive with a motor/encoder assembly, comprising:
   a motor housing;
   a DC brushless motor with driver circuits located entirely within the motor housing;
   an encoder with encoder sensors located entirely within the motor housing; and
   a tape cartridge driver mounting on the DC brushless motor.

4. The tape drive of claim 3, wherein the cape drive has a 5¼ inch form factor.

5. The assembly of claim 1, wherein the code wheel is a magnetic code wheel comprising a magnet-ring holder attached to the rotor, and a magnetic ring mounted to a surface of the magnetic-ring holder.

6. The assembly of claim 5, wherein the magnet-ring is axially magnetized and has alternating north and south poles around the circumference of the magnet-ring.

7. The assembly of claim 1, wherein the code wheel is an optical code wheel, and the code wheel sensor includes a U-shaped module with a light source and a sensor portion, positioned on the printed circuit board such that the optical code wheel passes the light source and the sensor portion.

8. A tape drive comprising:
   a motor housing;
   a DC motor mounted in the housing, the DC motor having a rotor, a field magnet attached to the rotor, and laminations and windings;
   a code wheel mounted on the rotor within the motor housing;
   a code wheel sensor fixedly mounted within the motor housing; and
   means housed within the motor housing for coupling a rotor to a tape cartridge, rotating a tape cartridge wheel, and encoding a position of the rotor, the means including said rotor rotatably mounted within the motor housing; and
   a printed circuit board stationary mounted in the motor housing, the sensor being mounted in motor housing on a top surface of the printed circuit board, and magnetic code wheel being mounted on the rotor axially above the top surface of the printed circuit board.

9. The tape drive of claim 8, wherein the laminations and windings are positioned in the motor housing axially below the printed circuit board.

10. The assembly of claim 8, wherein the code wheel is a magnetic code wheel comprising a magnet-ring holder attached to the rotor, and a magnetic ring mounted to a surface of the magnetic-ring holder.

11. The assembly of claim 10, wherein the magnet-ring is axially magnetized and has alternating north and south poles around the circumference of the magnet-ring.

12. The assembly of claim 8, wherein the code wheel is an optical code wheel, and the code wheel sensor includes a U-shaped module with a light source and a sensor portion, positioned on the printed circuit board such that the optical code wheel passes the light source and the sensor portion.

* * * * *

UNITED STATES PATENT AND TRADEMARK OFFICE
CERTIFICATE OF CORRECTION

| | |
|---|---|
| PATENT NO. | : 7,247,960 B2 |
| APPLICATION NO. | : 11/433665 |
| DATED | : July 24, 2007 |
| INVENTOR(S) | : Nayak and Heinze |

Page 1 of 1

It is certified that error appears in the above-identified patent and that said Letters Patent is hereby corrected as shown below:

Column 6, line 28, change "cape" to --tape--
Column 6, line 56, change "stationary" to --stationarily--

Signed and Sealed this

Thirteenth Day of November, 2007

JON W. DUDAS
*Director of the United States Patent and Trademark Office*